July 2, 1946.　　S. H. McALLISTER ET AL　　2,403,107
CATALYTIC PROCESSES
Filed Jan. 3, 1944　　2 Sheets-Sheet 1
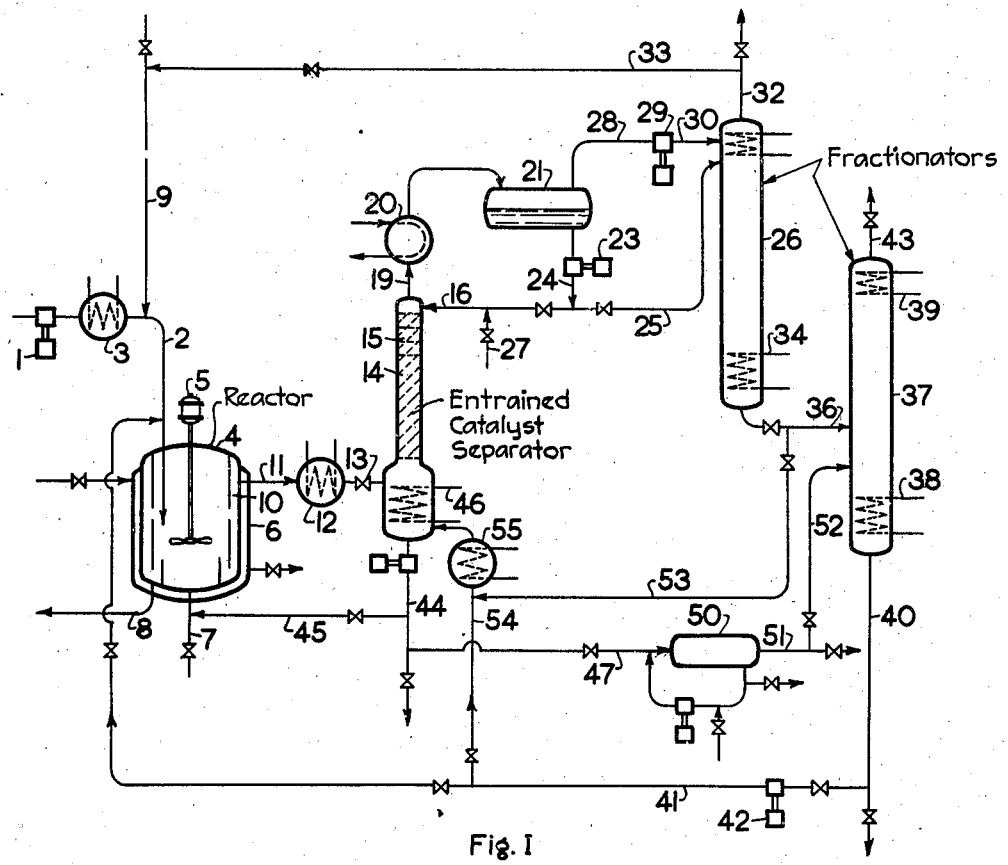
Fig. I
Inventors: Sumner H. McAllister
John Anderson
William E. Ross
By their Attorney:

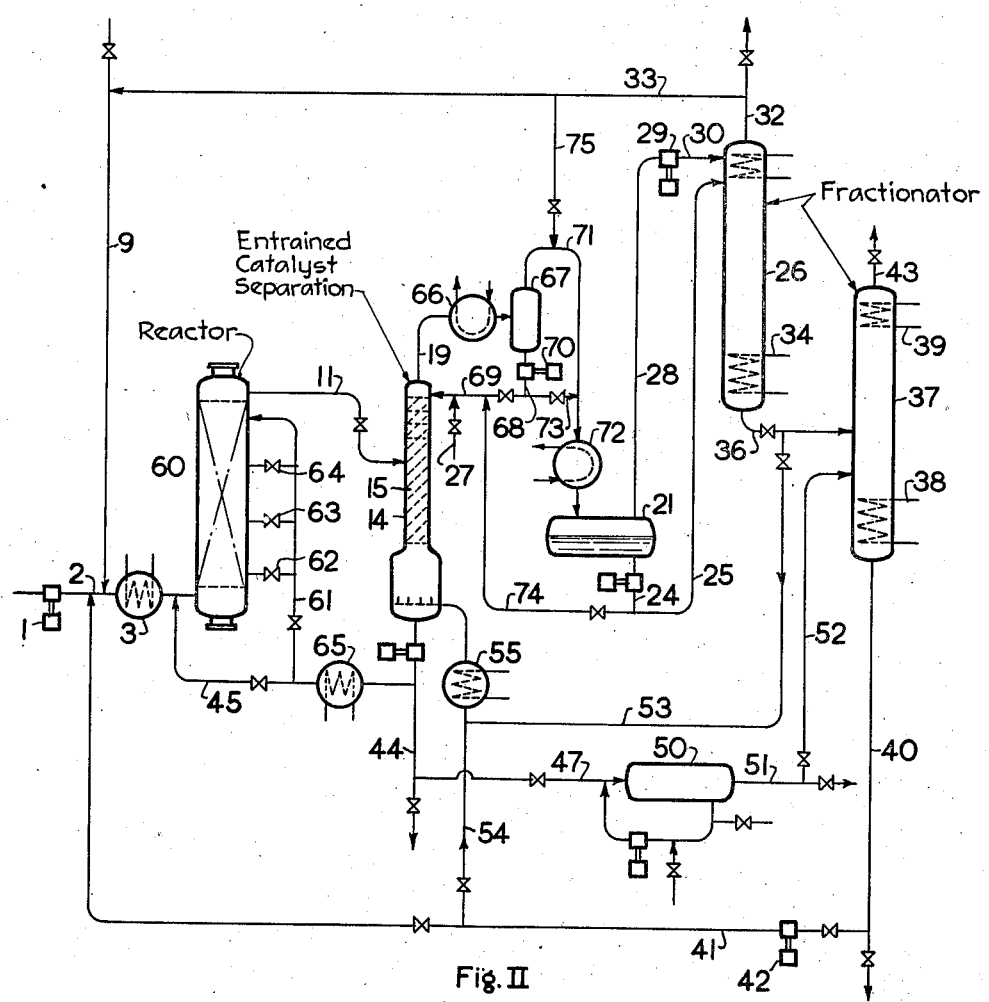
Fig. II
Inventors: Sumner H. McAllister
John Anderson
William E. Ross
By their Attorney: C. J. Ott Patented July 2, 1946

2,403,107

UNITED STATES PATENT OFFICE 2,403,107

CATALYTIC PROCESSES

Sumner H. McAllister, Lafayette, and John Anderson and William E. Ross, Berkeley, Calif., assignors to Shell Development Company, San Francisco, Calif., a corporation of Delaware Application January 3, 1944, Serial No. 516,832

17 Claims. (Cl. 260—683.5)

This invention relates to the treatment or conversion of hydrocarbons with the aid of catalysts or contact materials comprising metal halides and relates more particularly to catalytic hydrocarbon conversions executed in the presence of metal halides of the Friedel-Crafts type. A particular aspect of the invention relates to the production of branched chain saturated hydrocarbons from hydrocarbons comprising saturated hydrocarbons of straight chain or less branched chain structure.

Metal halides find application as catalysts or contact materials in many processes comprising those directed to the conversion or treatment of hydrocarbons. The manner in which these metal halides are employed varies in accordance with the particular process in which they are used. They may be used in solid form in which the size of the individual pieces may range from relatively large chunks to finely divided form. When used in the latter form they may be employed in combination with any of the many available carrier materials or as a suspension in liquid or gaseous media. In other processes they are used in the molten state functioning as catalysts, as diluents, as carrying media for reactants or other catalytic materials, or merely as means for imparting heat to, or withdrawing heat from, reactants or catalysts by direct contact therewith. In still other processes they may be utilized in the vapor state. Of the metal halides those of the Friedel-Crafts type are particularly favored because of their ability to function as catalysts for a great number of differing catalytic reactions wherein their degree of activity can be modified to attain particular results under specific operating conditions. These processes may employ a single metal halide or a mixture of two or more metal halides. Certain processes use the metal halide in a modified form, obtained, for example, as a reaction product resulting from the interaction of the metal halide with a suitable organic compound comprising, for example, a suitable olefinic, aromatic, naphthenic or even paraffinic hydrocarbon.

The degree to which the metal halides dissolve in hydrocarbons with which they are brought into contact during the process, as well as the ease with which they volatilize or sublime, will vary considerably depending upon the particular metal halide or mixture of halides, the nature and composition of the reactants and the operating conditions employed. The greater part of these compounds, particularly those of the Friedel-Crafts type, possesses one or several of these characteristics to a sufficient degree to render difficult, if not impossible, the complete avoidance of entrainment of small amounts thereof from the reaction zone together with the product stream. By the term "entrainment" as used throughout this specification and claims is meant any removal of metal halide from the reaction zone (and/or, in the case of liquid phase operation, from a catalyst separator comprising the type wherein catalyst is separated from reactants by stratification) together with the reactants regardless of whether such removal be caused by physical entrainment, solution, volatilization, sublimation, or any other method by which migration from the greater catalytic mass may be effected. Use of the catalyst in a finely divided state, the admixture of gaseous materials to the reactants and certain operating conditions, such as elevated temperatures and rapid throughput rates, variations in pressures, etc., contribute considerably to increasing the normal rate of entrainment generally encountered in the greater number of processes utilizing the metal halides as contact or catalytic materials.

Though the amount of metal halide so entrained from the reaction zone may appear from casual observation to be a relatively small and therefore an unimportant factor, it nevertheless is a major problem in processes utilizing these materials in the reaction zone and often results in difficulties deterring practical operation of a process. Thus, in processes utilizing a metal halide of the Friedel-Crafts type, such as, for example, aluminum chloride, the presence of the metal halide in the reactor effluence in such relatively small amounts as, for example, about 0.01%, seriously impairs efficient large scale operation of the process in the absence of means for the substantially complete removal of the entrained compound from the product stream prior to its passage into a subsequent product separating zone comprising fractionating systems. Such small amounts of entrained metal halide, even though in the presence of a sufficient amount of hydrocarbon to effect their solution under normal conditions, still result in serious fouling of heat exchangers, condensers, reboilers, and other parts of the equipment. They seriously interfere with normal operation of pumps, valves, control mechanisms, etc., and materially increase corrosion.

Means resorted to heretofore to effect the separation of these traces of entrained metal halides from the product stream have often been cumbersome and costly. Though certain methods enable substantial removal of the entrained material from the product stream, they are nevertheless generally handicapped by disadvantages which often offset to a substantial degree the benefits thereby obtained. The utilization of adsorptive support materials for the catalyst in the reaction zone, though reducing the degree of entrainment, in no wise eliminates it to any sufficient extent. Separation of entrained metal halide can be achieved to a substantial degree by the passage of the reactor effluence through beds of porous, and preferably highly adsorptive, materials. Such methods, though enabling substantial removal of entrained metal halide from the product stream, possess distinct disadvantages. Complete removal of the entrained material requires the use of large masses of the porous material and consequently cumbersome and costly apparatus. The method can, furthermore, not be operated continuously and requires periodic replacement of the porous mass. Recovery of the separated catalyst from the porous material is difficult and generally highly impractical. A more serious disadvantage of such methods resides in the fact that, notwithstanding intensive dehydration of the adsorptive material, its use in plant scale operation is, nevertheless, generally accompanied by a release of a still sufficient amount of water from the adsorbent during the course of operation to result not only in serious corrosion in subsequent pieces of apparatus, particularly when hydrogen halides are present, but in making necessary such steps as the drying of recycle streams prior to their return to the reaction zone. When hydrogen halide is one of the products to be recycled, and must be introduced into the reaction zone in the anhydrous state, the removal of traces of water therefrom is not only difficult but exceedingly costly. Introduction of additional liquid hydrocarbons into the reactor effluence for the purpose of dissolving the entrained metal halide, such as, for example, an aluminum halide, during its passage through the remainder of the system, does not of itself avoid such difficulties as the fouling of heat exchangers, condensers and reboilers, etc. Attempts to concentrate the entrained metal halide in one of the fractions separated during the course of a fractionation directed to the separation of the product stream into ultimately desired fractions are, of course, distinctly undesirable not only in that they render difficult efficient operation of such fractionating system but entail the operating and corrosion difficulties above-referred to in relatively costly and extensive portions of the apparatus.

It is an object of the invention to provide an improved process for the treatment or conversion of hydrocarbons with catalysts or contact materials comprising metal halides wherein the above difficulties are obviated and complete removal of any substantial traces of entrained metal halide from the reactor effluence is effected efficiently in a simple continuous and uninterrupted step within the process prior to subjection of said reactor effluence to any substantial degree of fractionation.

Another object of the invention is to provide a process for the more efficient treatment or conversion of hydrocarbons with the aid of metal halide catalysts of the Friedel-Crafts type, enabling the substantially complete separation of entrained metal halide from the reactor effluence prior to introduction of said reactor effluence into a product separating zone.

Still another object of the invention is the provision of an improved process for the more efficient production of branched chain saturated hydrocarbons from hydrocarbons comprising straight and/or less branched chain saturated hydrocarbons with the aid of metal halide catalysts of the Friedel-Crafts type, enabling the more efficient separation of substantially all traces of entrained metal halide from the reactor effluence prior to its introduction into a product separating zone.

Another object of the invention is to provide an improved process for enabling the more efficient isomerization of paraffinic hydrocarbons with the aid of catalysts comprising aluminum halide in the presence of a hydrogen halide promoter. Other objects and advantages of the invention will become apparent from the following detailed description thereof.

In accordance with the invention hydrocarbons comprising a hydrocarbon, or mixture of hydrocarbons, to be converted or treated are contacted with a catalyst or contact material comprising a metal halide of the Friedel-Crafts type, in a suitable reaction zone under conversion or treating conditions. Effluence from the reaction zone, comprising hydrocarbons and entrained metal halide, is introduced into an entrained metal halide separating zone at an intermediate point thereof. In the entrained metal halide separating zone the reactor effluence is contacted in the vapor state with a countercurrent stream of a controlled amount of cool hydrocarbons to condense substantially all traces of the entrained metal halide in the absence of any substantial condensation of hydrocarbons. Vapors comprising hydrocarbon reaction products free of any substantial trace of metal halide, and liquid comprising substantially all of the metal halide introduced into the entrained metal halide separating zone are separately withdrawn therefrom. It has been found that the amount of cool hydrocarbons which must be contacted with the hydrocarbon vapors to effect substantially complete removal of entrained metal halide therefrom under these conditions is relatively small compared to the volume of hydrocarbons treated. The cool hydrocarbons introduced into the entrained metal halide separating zone may emanate from an outside source or may comprise a suitable portion of hydrocarbons obtained within the system. In one embodiment of the invention condensate obtained by subjecting the vapors leaving the entrained metal halide separating zone to a cooling operation are introduced as the cool hydrocarbon stream into the entrained metal halide separating zone in an amount sufficient to, but never substantially exceeding, the amount required to effect substantially complete condensation of the entrained metal halide in the absence of any substantial hydrocarbon condensation. Vapors eliminated from the entrained metal halide separating zone, now free of any substantial trace of entrained aluminum halide, are passed to a fractionating zone wherein separation of desired fractions is effected. In a preferred modification of the invention a heated hydrocarbon stream, preferably obtained within the system as described more fully below, is introduced into the lower part of the entrained metal halide separating zone. Liquid, comprising separated metal halide, withdrawn from the entrained metal halide separating zone is passed in part or in its entirety to the reaction zone.

The process of the invention is applicable to the execution of a wide variety of catalytic hydrocarbon conversions and treatment effected with the aid of catalysts or contact agents comprising metal halides. However, in order to set forth more fully the nature of the invention it will be described in detail herein in its application to the production of branched chain hydrocarbons from hydrocarbons comprising straight chain or less branched chain hydrocarbons, with reference to the attached drawings wherein:

Figure I shows a more or less diagrammatical elevational section of one form of apparatus suitable for the execution, in accordance with the invention, of the liquid phase isomerization of hydrocarbons with the aid of fluid-type metal halide catalysts, Figure II shows a more or less diagrammatical elevational section of a modification of the apparatus of Figure I adapted to the isomerization of hydrocarbons in the vapor phase with the aid of solid metal halide catalysts.

Referring to Figure I of the drawings, an isomerizable saturated hydrocarbon, for example, butane, substantially free of moisture, is forced by means of pump 1 through line 2 and indirect heat exchanger 3 into a reaction zone. In passing through indirect heat exchanger 3 the butane is heated to a temperature sufficiently high to maintain the desired temperature conditions within the reaction zone. Heating means replacing or complementing heat exchanger 3 comprising, for example, a suitable type of hydrocarbon fluid heating furnace may be used. The reaction zone may comprise any suitable reactor enabling efficient contact between hydrocarbon reactants and the catalyst, for example, a reactor 4 of the mixer type provided with suitable stirring means 5 and valved lines 7 and 8 for inlet and outlet respectively of catalyst. The reactor preferably comprises suitable insulating means and a jacket 6 through which a fluid capable of adding or withdrawing heat from the reactor may be passed. Though but one such reactor is shown in the drawings, two or more such reactors, arranged in series or in parallel, may suitably be used.

Within reactor 4 butane is contacted with a suitable fluid, metal halide-containing catalyst comprising a metal halide of the Friedel-Crafts type. A wide variety of metal halide isomerization catalysts comprising molten salt mixtures may be used. A particularly suitable catalyst comprises, for example, a molten mixture of antimony trichloride and aluminum chloride in the approximate proportions of about 76 to 97 mol percent $SbCl_3$ and about 24 to 3 mol percent $AlCl_3$. Although a catalyst comprising aluminum chloride and antimony trichloride has been chosen as the preferred catalyst in the present illustrative description of the invention, it is to be understood that the invention is in no wise limited to the use of a catalyst containing any particular metal halide or any particular mixture of metal halides possessing the ability to isomerize hydrocarbons. Thus, suitable catalysts comprise molten mixtures of a halide of aluminum in admixture with one or more halides of one or more of the following, Li, Na, K, Cu, Mg, Zn, Cd, Sn, Pb, Sb, As, Bi, Cr, Mo, Fe, Co, Ni, etc. Suitable fluid-type catalysts also comprise those of the organo-metal halide complex type obtained by the interaction under suitable conditions of a metal halide and a suitable organic compound.

The temperature to be maintained within reactor 4 may range from the minimum temperature at which the catalyst can be maintained in the fluid state up to approximately 200° C. A particularly effective temperature may comprise, for example, a temperature in the range of from about 60° C. to about 150° C., depending upon the particular catalyst used. The pressure in reactor 4 may vary from the minimum pressure required to maintain at least a substantial part of the hydrocarbons in the liquid phase to any desired superatmospheric pressure. Pressures in the range of from 125 to 1,000 pounds gauge, for example, are quite suitable.

The isomerization is preferably effected in the presence of a hydrogen halide such as, for example, hydrogen chloride. This is introduced into the hydrocarbon feed, flowing through line 2, by means of valved line 9. The amount of hydrogen chloride introduced into the system may vary in accordance with the nature of the charge, the catalyst composition, and the operating conditions, and may range, for example, from about .03% to about 25% of the butane charged. If desired, inert gaseous materials comprising hydrogen, nitrogen, methane, CO, $CO_2$ and hydrocarbons other than those being isomerized, may be added to the hydrocarbon feed for the purpose of suppressing undesirable side reactions, diluting the charge or aiding in the introduction of heat into the reactor.

From reactor 4 the hydrocarbon reactants comprising admixed hydrogen halide and entrained catalyst are passed into a preliminary catalyst separating zone wherein separation of a hydrocarbon layer from a catalyst layer is effected by stratification. The preliminary separating zone may be separate from reactor 4 and provided with means for the recycling of the catalyst layer to the reactor, or it may be comprised within the reactor itself as is the annular preliminary separator 10 of reactor 4. The hydrocarbon layer comprising isobutane, normal butane and hydrogen halide is removed from the annular separator 10 through line 11.

Regardless of the time of residence of the hydrocarbon layer in the preliminary separating zone, it will generally comprise a certain amount of entrained catalyst components. The more soluble of the catalyst components will generally predominate. In the present illustrative description of the invention the antimony trichloride will exceed the aluminum chloride entrained by the hydrocarbon stream flowing through line 11. Heating means, for example, indirect heat exchanger 12 as well as a valve 13 are present in line 11. By means of the heat input into heat exchanger 12 or by suitable reduction of pressure in passing through valve 13 or by both of these expedients, the hydrocarbon stream is caused to vaporize to at least a substantial degree, and is then passed into an entrained catalyst separating zone. The entrained catalyst separating zone may comprise a chamber, or column, 14, at least a portion of which is provided with suitable packing material 15 such as, for example, Raschig rings, quartz chips, silica stone, etc., or several bubble trays. A sufficient amount of a cool hydrocarbon stream, for example, butanes, is introduced into the upper part of column 14, through line 16, at a temperature at, and preferably below, the bubble point of the hydrocarbon feed to the column, to bring about the separation of a liquid fraction comprising substantially all of the entrained catalyst components from a vapor fraction comprising isobutane, normal butane and hydrogen chloride free of any substantial trace of metal halides.

Conditions within column 14 as well as the amount of cool hydrocarbons introduced into the top thereof may vary within the scope of the invention depending to some degree upon the particular catalyst used and the amount of entrainment encountered. The amount of cool hydrocarbons introduced into column 14 is, however carefully controlled so as not to exceed the quantity required to effect substantially complete condensation of the entrained metal halides in the absence of any substantial condensation of butanes. Under the conditions of the present illustrative description of the invention it has been found that the introduction of cool butanes in an amount of from about 0.1 to about 0.2 percent by volume of the amount of hydrocarbon vapors taken overhead results in the reduction of SbCl$_3$ in the vapor fraction to less than 0.001% by weight and AlCl$_3$ to an amount too small to be detected. In extensive plant scale isomerization of butane with an AlCl$_3$-SbCl$_3$ catalyst, wherein the feed to column 14 was at about 74° C., the top and bottom temperatures of the column were about 58° C. and 64° C., respectively, and condensed butanes at a temperature of about 35° C. were introduced into the upper part of the column at the rate of about 0.2 percent by volume of the hydrocarbon overhead of the column, the SbCl$_3$ content of the vapor overhead was less than about 0.001% and the AlCl$_3$ content too small to be detected. The liquid removed from the bottom of column 14 consisted of about 98.5% SbCl$_3$ and about 1.5% AlCl$_3$ by weight.

The vapor fraction is passed from column 14, through line 19 and cooler 20, into an accumulator 21. In passing through cooler 20 the stream is cooled to a temperature sufficiently low to condense at least a substantial part of the butanes passed therethrough. Liquid is drawn from accumulator 21 by means of pump 23 and forced through lines 24 and 25 into a stripping column 26. A portion of the hydrocarbons drawn from accumulator 21 through line 24, is passed into line 16 to provide the cool hydrocarbon stream introduced into the upper part of column 14. Additional cooling means not shown in the drawings may be provided to effect further cooling of the hydrocarbon stream flowing through line 16. A valved line 27 is provided for the introduction of hydrocarbons from an outside source into line 16. Vapors and gases comprising hydrogen chloride may be drawn from accumulator 21 through line 28 to a compressor 29. From the high pressure side of compressor 29 the compressed stream is passed through line 30 into stripping column 26.

Within stripping column 26 a gaseous fraction comprising hydrogen chloride is separated from a liquid fraction comprising isobutane and normal butane. A high pressure, for example, in excess of from about 300 pounds, is preferably maintained within column 26 to aid in effecting the desired separation. The gaseous fraction comprising hydrogen chloride is eliminated from the top of column 26 through valved line 32 and is recycled at least in part through valved line 33 into line 9. Suitable means such as, for example, a reboiler or heating coil 34, are provided in the lower part of column 26 to aid in effecting the desired separation therein. Liquid comprising isobutane and normal butane is withdrawn from the bottom of column 26 and passed through valved line 36 into a fractionator 37. Fractionator 37 is provided with suitable heating means such as, for example, a reboiler or heating coil 38 in the bottom part thereof, and suitable cooling means such as, for example, a cooling coil 39 in the upper part thereof. Within fractionator 37 a vapor fraction comprising isobutane is separated from a liquid fraction comprising normal butane. Liquid comprising normal butane is withdrawn from fractionator 37 through valved line 40 and eliminated from the system or forced in part or in its entirety through valved line 41, by means of pump 42, into line 2.

Vapors comprising isobutane are withdrawn overhead from fractionator 37 through valved line 43 as a final product and passed to conventional condensing and recovery means.

Liquid is withdrawn from column 14 through line 44 and is recycled in part or in its entirety through valved lines 45 and 7 to reactor 4. Operation of column 14 within the scope of the invention may comprise the presence of little, if any, accumulation of liquid in the lower part thereof. In general, however, it is preferred to conduct the operation with a substantial accumulation of liquid in the lower part of the column. The relatively low melting temperature of SbCl$_3$ will result in the stratification of the accumulated liquid into an upper hydrocarbon layer and a lower catalyst layer consisting of SbCl$_3$ containing AlCl$_3$ dissolved therein. A closed heating coil 46 is provided in the lower part of the column to enable revaporization of the hydrocarbon layer. Liquid withdrawn through line 44 will then comprise essentially only SbCl$_3$ and AlCl$_3$ in the molten state. With the use of the above preferred AlCl$_3$-SbCl$_3$ catalyst, the liquid so withdrawn will generally comprise from 1 to about 10 percent, and more often not more than about 3 percent by weight, of AlCl$_3$.

When utilizing a catalyst containing no substantial amount of such low-boiling catalyst component, or none at all, for example, a catalyst consisting predominantly of only AlCl$_3$, the bottoms withdrawn from column 14 will comprise the entrained catalyst in suspension, or solution, in butanes. The amount of butanes thus withdrawn as a liquid fraction from column 14 will generally comprise but a small portion, for example, not more than about 4% of the butanes charged to column 14. When thus withdrawing liquid comprising butanes containing the separated entrained catalyst from column 14, it may be recycled to the reaction zone or passed in part or in its entirety from line 44, through valved line 47 to a treating zone. The treating zone may comprise any type of suitable equipment enabling the separation of metal halides from the hydrocarbon stream. The treating zone is diagrammatically represented in the drawings by means of treating tank 50 provided with suitable means for introducing and recycling therethrough suitable treating agents, means for withdrawing spent treating agents comprising separated metal halides therefrom, etc. The invention is in no wise limited to the treatment employed within tank 50 and will depend to some degree upon the particular metal halide or halides present. Thus when the halide comprises essentially only antimony trichloride, the fraction may simply be subjected to water-washing and the resulting precipitated antimony compounds separated therefrom. If the metal halide consists essentially of aluminum chloride, the fraction may be treated with a caustic solution to effect neutralization and removal of the aluminum chloride. The resulting hydrocarbon stream, comprising iso and normal butanes now free of any substantial traces of metal halides, is eliminated from treating tank 50 through valved line 51 and passed in part or in its entirety through valved line 52 into fractionator 37.

In order to aid in effecting the desired separation within column 14 and particularly to effect the elimination of substantially all dissolved hydrogen chloride from the liquid fraction separated therein, a part of the hydrocarbons drawn from stripping column 26 through line 36 is passed through valved lines 53 and 54 into the lower part of column 14. If desired, a part or all of the hydrocarbons thus introduced into column 14 through line 54 may comprise a portion of the normal butane recycled through line 41. The hydrocarbons are introduced into the lower part of column 14 at a temperature equal to or slightly above their vaporizing temperature, to the attainment of which a heater 55 is provided in line 54.

A modification of the apparatus shown in Figure I, suitable for the execution of hydrocarbon isomerizations in the vapor phase with the aid of solid type metal halide catalysts in accordance with the invention, is shown in Figure II wherein all parts of apparatus identical with those of Figure I have been indicated with like reference characters. The apparatus of Figure II differs mainly from that of Figure I in the nature of the reaction zone, the type of catalyst therein and in the presence of a two-stage cooling system for the vapor overhead from column 14.

The hydrocarbon to be isomerized, for example, normal butane, flowing through line 2 in admixture with added hydrogen halide, for example, hydrogen chloride, emanating from line 9, is vaporized in passing through indirect heat exchanger 3 and passed through a suitable reaction zone, for example, an enlarged chamber 60 containing a solid type aluminum chloride catalyst. Although aluminum chloride has been chosen as the preferred catalyst, suitable isomerization catalysts comprise any of the metal halides of the Friedel-Crafts type. The catalyst may be employed per se, in lumps, or may comprise the catalyst in admixture with suitable inert material. The catalyst may comprise a metal halide in finely divided form supported upon suitable carrier material preferably of a porous nature. A particularly advantageous type of catalyst comprises a halide of aluminum, for example, aluminum bromide and/or aluminum chloride, supported upon an adsorptive material preferably of aluminous character such as, for example, activated alumina, bauxite, etc. The temperature in reactor 60 may range from about 20° C. to about 350° C., depending upon the material treated and the particular catalyst used. With the use of aluminum chloride-containing catalysts temperatures in the range of from about 50° C. to about 150° C. are somewhat preferred. Any suitable pressure comprising subatmospheric, atmospheric or superatmospheric pressures enabling maintenance of at least a substantial part of the reactants in the vapor phase may be employed.

Reactor effluence comprising isobutane, normal butane, hydrogen chloride and entrained aluminum chloride is passed from reactor 60 through line 11 into an intermediate part of the entrained metal halide separating column 14. Within column 14 a liquid fraction, comprising a relatively small proportion of the butanes introduced into the column and substantially all of the entrained aluminum chloride introduced into the column, is separated from a vapor fraction free of any substantial trace of aluminum chloride and comprising isobutane, normal butane and hydrogen chloride. The desired separation of the entrained aluminum chloride within column 14 is obtained substantially as described above for liquid phase operation, by the introduction of cool hydrocarbons in controlled amount into the upper part of column 14. The temperature and actual amount of cool hydrocarbon so introduced into the upper part of the column may vary within the scope of the invention. They should, however, be at a temperature not exceeding and preferably below the bubble temperature of the reactants in the column. The temperature gradient to be maintained within column 14 will be governed to some degree by the amount of hydrogen chloride to be tolerated in the liquid bottoms.

In the vapor phase isomerization of butane with the aid of a catalyst consisting of aluminum chloride deposited upon activated alumina producing a reactor effluence containing about 70° C. of superheat and 0.01 mol percent of entrained aluminum chloride, maintenance of a temperature of about 80° C. in the upper part, and a temperature of about 95° C. in the lower part of column 14 is satisfactory. These conditions, obtained with the introduction into the upper part of the column 14 of liquid butanes at a temperature of about 50° C. and at a rate of about 0.3 mol per mol of butane vapors taken overhead from the column, will result in the production of a vapor overhead containing less than about 0.001 mol percent of aluminum chloride. The liquid fraction separated in column 14 under these conditions will represent about 2.5% of the butane vapor taken overhead and will contain about 0.5 mol percent of aluminum chloride and 3.5 mol percent of hydrogen chloride.

When the liquid fraction separated in column 14 is recycled to reactor 60 through lines 44 and 45, removal of the hydrogen chloride from the recycled liquid bottoms is generally not required. In operating with a solid or supported type catalyst, it will be found desirable to pass at least a part of the liquid aluminum chloride-containing fraction recycled through line 45 to intermediate parts of reactor 60. A valved line 61 with valved branched lines 62, 63 and 64 entering the reactor 60 at intermediate points along the length thereof are provided. Indirect heat exchanger 65 is positioned in line 45 to enable maintenance of the hydrocarbon stream flowing therethrough at the desired temperature.

When the aluminum chloride-containing liquid bottoms from column 14 are not recycled to the reaction zone but are passed in part or in their entirety through line 47 to the treating zone comprising treating tank 50, it is preferred to effect substantial removal of HCl therefrom prior to their withdrawal from column 14. This is preferably accomplished as described above by the introduction of a hydrocarbon stream emanating from the lower part of columns 26 and/or 37 at a temperature, at or above the dew point of the reactants in column 14, into the lower part of the column through line 54. By thus introducing the heated hydrocarbon into the lower part of column 14, the hydrogen chloride content of the liquid bottoms is readily reduced to an amount not exceeding, for example, about 0.01 mol percent. If desired, the liquid bottoms separated in column 14 may be subjected to a stripping operation in a separate zone not shown in the drawings and the overhead thus produced, comprising hydrogen halide, returned to column 14.

It is thus seen that the process of the invention by enabling the removal of substantially all traces of entrained aluminum chloride from the reactor effluence eliminates completely the difficulties due to catalyst entrainment by a relatively simple method exceeding by far in practicality the methods utilized heretofore.

In a preferred modification of the invention the vapor stream comprising normal butane, isobutane and hydrogen chloride free of any substantial traces of aluminum chloride passing from column 14 to accumulator 21 is subjected to a preliminary cooling operation resulting in the condensation of at least a sufficient amount of the butanes for introduction into the upper part of column 14 before cooling the remainder of the stream to the temperature to be maintained in accumulator 21. Accordingly, the vapor stream emanating from column 14 is passed through line 19 and preliminary cooler 66 into an accumulating drum 67. At least a part of the liquid is removed from accumulator drum 67 through line 68 and forced by means of pump 70 through line 69 into the upper part of column 14. Uncondensed vapors are passed from accumulator 67 through line 71 and cooler 72 into accumulator 21. Liquid withdrawn from accumulator 67 in excess of that required for introduction into the upper part of column 14 is passed through line 73 into line 71 at a point up stream from cooler 72. Cooler 72 may comprise any suitable type of cooling and/or refrigerating means. Since the maintenance of a temperature considerably lower than that of the hydrocarbon introduced into the upper part of column 14 is generally maintained within accumulator 21, considerable saving in cost, and substantial improvement in efficiency of operation is obtained by thus effecting a primary and separate cooling of a portion of the vapor overhead from column 14 to the temperature suitable for recycling thereto. A valved line 74 is provided for the passage of liquid from accumulator 21 through lines 24 and 74 into line 69, should this be required to supplement the amount of liquid passed through line 69 or to aid in maintaining the temperature of the latter stream. The two-stage cooling of the overhead is particularly advantageous when utilizing accumulator 21 to store within the system any excess of HCl over that required for recycling to the reactor. A valved line 75 is provided for the passage from line 33 into line 71 of any HCl exceeding the amount required for immediate introduction into the reaction zone.

Although the detailed description of the invention has been directed to the isomerization of a straight chain praffin, it is to be understood that the invention is in no wise limited in its application to the isomerization of any particular hydrocarbon and may be applied broadly not only to the isomerization of any isomerizable hydrocarbon with the aid of metal halide catalysts but to any type of hydrocarbon conversion operation wherein use is made of catalysts or contact materials comprising a metal halide. Such conversion operations comprise not only isomerization but alkylation, cracking, polymerization, desulfurization, reforming, etc., of hydrocarbons or hydrocarbon-containing materials.

This is a continuation-in-part of co-pending application Serial Number 404,056, filed July 25, 1941, now Patent Ser. No. 2,360,699, issued Oct. 17, 1944.

We claim as our invention:

1. In a catalytic hydrocarbon conversion process wherein saturated hydrocarbons are contacted at conversion conditions with a catalyst comprising a solution of aluminum chloride in antimony trichloride in a reaction zone and effluence from said reaction zone is passed to a fractionating zone, the steps which comprise contacting said reactor effluence comprising hydrocarbon reaction products and entrained catalyst components in the vapor state with a countercurrent stream of a controlled amount of cool hydrocarbons in a catalyst separating zone to effect the condensation of substantially all of said catalyst components in the absence of any substantial condensation of said hydrocarbon reaction products, separately removing vapors comprising hydrocarbon reaction products free of any substantial trace of catalyst components and liquid comprising aluminum chloride dissolved in antimony trichloride from said catalyst separating zone, cooling said vapors to condense at least a part thereof, passing a sufficient portion of the resulting condensate into said catalyst separating zone to provide said stream of cool hydrocarbons used therein, and passing the remainder of said condensate to said fractionating zone.

2. In a catalytic hydrocarbon conversion process wherein hydrocarbons are converted by contact in admixture with a hydrogen halide at conversion conditions with a catalyst comprising a metal halide of the Friedel-Crafts type in a reaction zone, reactor effluence comprising hydrocarbon reaction products, hydrogen halide and entrained metal halide is passed to a fractionating zone, and a gaseous fraction comprising hydrogen halide is separated from a liquid fraction comprising hydrocarbons in said fractionating zone, the steps which comprise contacting said reactor effluence in the vapor state with a countercurrent stream of a controlled amount of cool hydrocarbons in a catalyst separating zone to effect the condensation of substantially all of said metal halide in the absence of any substantial condensation of said hydrocarbon reaction products, separately removing vapors comprising hydrocarbon reaction products and hydrogen halide free of any substantial trace of metal halide and liquid comprising hydrocarbons containing substantially all of said metal halide from said catalyst separating zone, cooling said vapors to condense at least a part thereof, passing a sufficient portion of the resulting condensate into said catalyst separating zone to provide said stream of cool hydrocarbons used therein, passing the remainder of said condensate to said fractionating zone, and passing a part of said liquid fraction from said fractionating zone at vaporizing temperature into the lower part of said catalyst separating zone.

3. In a catalytic hydrocarbon conversion process wherein saturated hydrocarbons are converted by contact in admixture with a hydrogen halide at conversion conditions with a catalyst comprising an aluminum halide in a reaction zone, reactor effluence comprising hydrocarbon reaction products, hydrogen halide and entrained aluminum halide is passed to a fractionating zone, and a gaseous fraction comprising hydrogen halide is separated from a liquid fraction comprising hydrocarbons in said fractionating zone, the steps which comprise contacting said reactor effluence in the vapor state with a countercurrent stream of a controlled amount of cool hydrocarbons in a catalyst separating zone to effect the condensation of substantially all of said aluminum halide in the absence of any substantial condensation of said hydrocarbon reaction products, separately removing vapors comprising hydrocarbon reaction products and hydrogen halide free of any substantial trace of aluminum halide and liquid comprising hydrocarbons containing substantially all of said aluminum halide from said catalyst separating zone, cooling said vapors to condense at least a part thereof, passing a sufficient portion of the resulting condensate into said catalyst separating zone to provide said stream of cool hydrocarbons used therein, passing the remainder of said condensate to said fractionating zone, and passing a part of said liquid fraction from said fractionating zone at vaporizing temperature into the lower part of said catalyst separating zone.

4. In a catalytic butane isomerization process wherein butane is converted to isobutane by contact in admixture with a hydrogen halide at isomerizing conditions with a catalyst comprising an aluminum halide in a reaction zone, reactor effluence comprising isobutane, normal butane, hydrogen halide and entrained aluminum halide is passed to a fractionating zone, and a gaseous fraction comprising hydrogen halide is separated from a liquid fraction comprising butane in said fractionating zone, the steps which comprise contacting said reactor effluence in the vapor state with a countercurrent stream of a controlled amount of cool hydrocarbons in a catalyst separating zone to effect the condensation of substantially all of said aluminum halide in the absence of any substantial condensation of butanes, separately removing vapors comprising isobutane, normal butane and hydrogen halide free of any substantial trace of aluminum halide and liquid comprising butanes containing substantially all of said aluminum halide from said catalyst separating zone, cooling said vapors to condense at least a part thereof, passing a sufficient portion of the resulting condensate into said catalyst separating zone to provide said stream of cool hydrocarbons used therein, passing the remainder of said condensate to said fractionating zone, and passing a part of said liquid fraction from said fractionating zone at vaporizing temperature into the lower part of said catalyst separating zone.

5. In a catalytic hydrocarbon conversion process wherein hydrocarbons are converted by contact in admixture with a hydrogen halide at conversion conditions with a catalyst comprising a metal halide of the Friedel-Crafts type in a reaction zone, reactor effluence comprising hydrocarbon reaction products, hydrogen halide and entrained metal halide is passed through an accumulating zone into a fractionating zone, a gaseous fraction comprising hydrogen halide is separated from a liquid fraction comprising hydrocarbons in said fractionating zone, and a part of said gaseous fraction is passed to said accumulating zone, the steps which comprise contacting said reactor effluence in the vapor state with a countercurrent stream of a controlled amount of cool hydrocarbons in a catalyst separating zone to effect the condensation of substantially all of said metal halide in the absence of any substantial condensation of said hydrocarbon reaction products, separately removing vapors comprising hydrocarbon reaction products and hydrogen halide free of any substantial trace of metal halide and liquid comprising hydrocarbons containing substantially all of said metal halide from said catalyst separating zone, cooling said vapors in a first cooling zone to condense at least a part thereof, passing at least a part of said condensate from said first cooling zone into said catalyst separating zone to provide said stream of cool hydrocarbons used therein, further cooling the remaining vapors and condensate in a second cooling zone, passing cooled vapors and condensate from said second cooling zone into said accumulating zone, and passing hydrocarbons and hydrogen halide from said accumulating zone to said fractionating zone.

6. In a catalytic hydrocarbon conversion process wherein saturated hydrocarbons are converted by contact in admixture with a hydrogen halide at conversion conditions with a catalyst comprising an aluminum halide in a reaction zone, reactor effluence comprising hydrocarbon reaction products, hydrogen halide and entrained aluminum halide is passed through an accumulating zone into a fractionating zone, a gaseous fraction comprising hydrogen halide is separated from a liquid fraction comprising hydrocarbons in said fractionating zone, and a part of said gaseous fraction is passed to said accumulating zone, the steps which comprise contacting said reactor effluence in the vapor state with a countercurrent stream of a controlled amount of cool hydrocarbons in a catalyst separating zone to effect the condensation of substantially all of said aluminum halide in the absence of any substantial condensation of said hydrocarbon reaction products, separately removing vapors comprising hydrocarbon reaction products and hydrogen halide free of any substantial trace of aluminum halide and liquid comprising hydrocarbon containing substantially all of said aluminum halide from said catalyst separating zone, cooling said vapors in a first cooling zone to condense at least a part thereof, passing at least a part of said condensate from said first cooling zone into said catalyst separating zone to provide said stream of cool hydrocarbons used therein, further cooling the remaining vapors and condensate in a second cooling zone, passing cooled vapors and condensate from said second cooling zone into said accumulating zone, and passing hydrocarbons and hydrogen halide from said accumulating zone to said fractionating zone.

7. In a catalytic hydrocarbon conversion process wherein normal and branched chain isomerizable saturated hydrocarbons are converted to branched and more highly branched chain saturated hydrocarbons respectively by contact in admixture with a hydrogen halide at isomerizing conditions with a catalyst comprising aluminum chloride in a reaction zone, reactor effluence comprising hydrocarbon reaction products, hydrogen halide and entrained aluminum chloride is passed through an accumulating zone into a fractionating zone, a gaseous fraction comprising hydrogen halide is separated from a liquid fraction comprising hydrocarbons in said fractionating zone, and a part of said gaseous fraction is passed to said accumulating zone, the steps which comprise contacting said reactor effluence in the vapor state with a countercurrent stream of a controlled amount of cool hydrocarbons in a catalyst separating zone to effect the condensation of substantially all of said aluminum chloride in the absence of any substantial condensation of said hydrocarbon reaction products, separately removing vapors comprising hydrocarbon reaction products and hydrogen halide free of any substantial trace of aluminum chloride and liquid comprising hydrocarbons containing substantially all of said aluminum chloride from said catalyst separating zone, cooling said vapors in a first cooling zone to condense at least a part thereof, passing at least a part of said condensate from said first cooling zone into said catalyst separating zone to provide said stream of cool hydrocarbons used therein, further cooling the remaining vapors and condensate in a second cooling zone, passing cooled vapors and condensate from said second cooling zone into said accumulating zone, and passing hydrocarbons and hydrogen halide from said accumulating zone to said fractionating zone.

8. In a catalytic hydrocarbon conversion process wherein hydrocarbons are converted by contact in admixture with a hydrogen halide at conversion conditions with a catalyst comprising a metal halide of the Friedel-Crafts type in a reaction zone, reactor effluence comprising hydrocarbon reaction products, hydrogen halide and entrained metal halide is passed through an accumulating zone into a fractionating zone, a gaseous fraction comprising hydrogen halide is separated from a liquid fraction comprising hydrocarbons in said fractionating zone, and a part of said gaseous fraction is passed to said accumulating zone, the steps which comprise contacting said reactor effluence in the vapor state with a countercurrent stream of a controlled amount of cool hydrocarbons in a catalyst separating zone to effect the condensation of substantially all of said metal halide in the absence of any substantial condensation of said hydrocarbon reaction products, separately removing vapor comprising hydrocarbon reaction products and hydrogen halide free of any substantial trace of metal halide and liquid comprising hydrocarbons containing substantially all of said metal halide from said catalyst separating zone, cooling said vapors in a first cooling zone to condense at least a part thereof, passing at least a part of said condensate from said first cooling zone into said catalyst separating zone to provide said stream of cool hydrocarbons used therein, further cooling the remaining vapors and condensate in a second cooling zone, passing cooled vapors and condensate from said second cooling zone into said accumulating zone, passing hydrocarbons and hydrogen halide from said accumulating zone to said fractionating zone, and passing a part of said liquid fraction from said fractionating zone at vaporizing temperature into the lower part of said catalyst separating zone.

9. In a catalytic hydrocarbon conversion process wherein saturated hydrocarbons are converted by contact in admixture with a hydrogen halide at conversion conditions with a catalyst comprising aluminum chloride in a reaction zone, reactor effluence comprising hydrocarbon reaction products, hydrogen halide and entrained aluminum chloride is passed through an accumulating zone into a fractionating zone, a gaseous fraction comprising hydrogen halide is separated from a liquid fraction comprising hydrocarbons in said fractionating zone, and a part of said gaseous fraction is passed to said accumulating zone, the steps which comprise contacting said reactor effluence in the vapor state with a countercurrent stream of a controlled amount of cool hydrocarbons in a catalyst separating zone to effect the condensation of substantially all of said aluminum chloride in the absence of any substantial condensation of said hydrocarbon reaction products, separately removing vapors comprising hydrocarbon reaction products and hydrogen halide free of any substantial trace of aluminum chloride and liquid comprising hydrocarbons containing substantially all of said aluminum chloride from said catalyst separating zone, cooling said vapors in a first cooling zone to condense at least a part thereof, passing at least a part of said condensate from said first cooling zone into said catalyst separating zone to provide said stream of cool hydrocarbons used therein, further cooling the remaining vapors and condensate in a second cooling zone, passing cooled vapors and condensate from said second cooling zone into said accumulating zone, passing hydrocarbons and hydrogen halide from said accumulating zone to said fractionating zone, and passing a part of said liquid fraction from said fractionating zone at vaporizing temperature into the lower part of said catalyst separating zone.

10. In a catalytic butane isomerization process wherein butane is converted to isobutane by contact in admixture with hydrogen chloride at isomerizing conditions with a catalyst comprising aluminum chloride in a reaction zone, reactor effluence comprising isobutane, normal butane, hydrogen chloride and entrained aluminum chloride is passed through an accumulating zone into a fractionating zone, a gaseous fraction comprising hydrogen chloride is separated from a liquid fraction comprising butane in said fractionating zone, and a part of said gaseous fraction is passed to said accumulating zone, the steps which comprise contacting said reactor effluence in the vapor state with a countercurrent stream of a controlled amount of cool hydrocarbons in a catalyst separating zone to effect the condensation of substantially all of said aluminum chloride in the absence of any substantial condensation of butanes, separately removing vapors comprising isobutane, normal butane and hydrogen chloride free of any substantial trace of aluminum chloride and liquid comprising butanes containing substantially all of said aluminum chloride from said catalyst separating zone, cooling said vapors in a first cooling zone to condense at least a part thereof, passing at least a part of said condensate from said first cooling zone into said catalyst separating zone to provide said stream of cool butanes used therein, further cooling the remaining vapors and condensate in a second cooling zone, passing cooled vapors and condensate from said second cooling zone into said accumulating zone, passing butanes and hydrogen halide from said accumulating zone to said fractionating zone, and passing a part of said liquid fraction from said fractionating zone at vaporizing temperature into the lower part of said catalyst separating zone.

11. In a catalytic hydrocarbon conversion process wherein normal and branched chain isomerizable saturated hydrocarbons are converted to branched and more highly branched chain hydrocarbons respectively, having the same number of carbon atoms to the molecule as the hydrocarbons charged, by contact at isomerizing conditions with a catalyst comprising a metal halide of the Friedel-Crafts type in a reaction zone and effluence from said reaction zone is passed to a fractionating zone, the steps which comprise contacting said reactor effluence comprising hydrocarbons and entrained metal halide in the vapor state with a counter-current stream of a controlled amount of cool hydrocarbons having the same number of carbon atoms to the molecule as said isomerized hydrocarbons in a catalyst separating zone to effect the condensation of substantially all of said entrained metal halide in the absence of any substantial condensation of hydrocarbons, separately removing vapors comprising hydrocarbons free of any substantial trace of metal halide and liquid comprising hydrocarbons containing substantially all of said entrained metal halide from said catalyst separating zone, and passing at least a part of said vapors from said catalyst separating zone to said fractionating zone.

12. In a catalytic hydrocarbon conversion process wherein normal and branched chain isomerizable saturated hydrocarbons are converted to branched and more highly branched chain hydrocarbons respectively, having the same number of carbon atoms to the molecule as the hydrocarbons charged by contact at isomerizing conditions with a catalyst comprising a solution of aluminum chloride in antimony trichloride in a reaction zone and effluence from said reaction zone is passed to a fractionating zone, the steps which comprise contacting said reactor effluence comprising hydrocarbons and entrained catalyst components in the vapor state with a counter-current stream of a controlled amount of cool hydrocarbons having the same number of carbon atoms to the molecule as said isomerized hydrocarbons in a catalyst separating zone to effect the condensation of substantially all of said entrained catalyst components in the absence of any substantial condensation of hydrocarbons, separately removing vapors comprising hydrocarbons free of any substantial trace of catalyst components and liquid comprising aluminum chloride dissolved in antimony trichloride from said catalyst separating zone, and passing at least a part of said vapors from said catalyst separating zone to said fractionating zone.

13. In a catalytic hydrocarbon conversion process wherein normal and branched chain isomerizable saturated hydrocarbons are converted to branched and more highly branched chain hydrocarbons respectively, having the same number of carbon atoms to the molecule as the hydrocarbons charged, by contact at isomerizing conditions with a catalyst comprising aluminum chloride in a reaction zone and effluence from said reaction zone is passed to a fractionating zone, the steps which comprise contacting said reactor effluence comprising hydrocarbons and entrained aluminum chloride in the vapor state with a counter-current stream of a controlled amount of cool hydrocarbons having the same number of carbon atoms to the molecule as said isomerized hydrocarbons in a catalyst separating zone to effect the condensation of substantially all of said entrained aluminum chloride in the absence of any substantial condensation of hydrocarbons, separately removing vapors comprising hydrocarbons free of any substantial trace of aluminum chloride and liquid comprising hydrocarbons containing substantially all of said entrained aluminum chloride from said catalyst separating zone, and passing at least a part of said vapors from said catalyst separating zone to said fractionating zone.

14. In a catalytic hydrocarbon conversion process wherein normal and branched chain isomerizable saturated hydrocarbons are converted to branched and more highly branched chain hydrocarbons respectively, having the same number of carbon atoms to the molecule as the hydrocarbons charged, by contact at isomerizing conditions with a catalyst comprising a metal halide of the Friedel-Crafts type in a reaction zone and effluence from said reaction zone is passed to a fractionating zone, the steps which comprise contacting said reactor effluence comprising hydrocarbons and entrained metal halide in the vapor state with a counter-current stream of a controlled amount of cool hydrocarbons having the same number of carbon atoms to the molecule as said isomerized hydrocarbons in a catalyst separating zone to effect the condensation of substantially all of said entrained metal halide in the absence of any substantial condensation of hydrocarbons, separately removing vapors comprising hydrocarbons free of any substantial trace of metal halide and liquid comprising hydrocarbons containing substantially all of said entrained metal halide from said catalyst separating zone, passing said vapors from said catalyst separating zone to said fractionating zone, and passing at least a part of said liquid to said reaction zone.

15. In a catalytic hydrocarbon conversion process wherein normal and branched chain isomerizable saturated hydrocarbons are converted to branched and more highly branched chain hydrocarbons respectively, having the same number of carbon atoms to the molecule as the hydrocarbons charged by contact at isomerizing conditions with a catalyst comprising a solution of aluminum chloride in antimony trichloride in a reaction zone and effluence from said reaction zone is passed to a fractionating zone, the steps which comprise contacting said reactor effluence comprising hydrocarbons and entrained catalyst components in the vapor state with a counter-current stream of a controlled amount of cool hydrocarbons having the same number of carbon atoms to the molecule as said isomerized hydrocarbons in a catalyst separating zone to effect the condensation of substantially all of said entrained catalyst components in the absence of any substantial condensation of hydrocarbons, separately removing vapors comprising hydrocarbons free of any substantial trace of catalyst components and liquid comprising aluminum chloride dissolved in antimony trichloride from said catalyst separating zone, passing vapors from said catalyst separating zone to said fractionating zone, and passing at least a part of said liquid to said reaction zone.

16. In a catalytic hydrocarbon conversion process wherein normal and branched chain isomerizable saturated hydrocarbons are converted to branched and more highly branched chain hydrocarbons respectively, having the same number of carbon atoms to the molecule as the hydrocarbons charged by contact at isomerizing conditions with a catalyst comprising aluminum chloride in a reaction zone and effluence from said reaction zone is passed to a fractionating zone, the steps which comprise contacting said reactor effluence comprising hydrocarbons and entrained aluminum chloride in the vapor state with a counter-current stream of a controlled amount of cool hydrocarbons having the same number of carbon atoms to the molecule as said isomerized hydrocarbons in a catalyst separating zone to effect the condensation of substantially all of said entrained aluminum chloride in the absence of any substantial condensation of hydrocarbons, separately removing vapors comprising hydrocarbons free of any substantial trace of aluminum chloride and liquid comprising hydrocarbons containing substantially all of said entrained aluminum chloride from said catalyst separating zone, passing vapors from said catalyst separating zone to said fractionating zone, and passing at least a part of said liquid to said reaction zone.

17. In a catalytic hydrocarbon conversion process wherein normal and branched chain isomerizable saturated hydrocarbons are converted to branched and more highly branched chain hydrocarbons respectively, having the same number of carbon atoms to the molecule as the hydrocarbons charged by contact at isomerizing conditions with a catalyst comprising a metal halide of the Friedel-Crafts type in a reaction zone and effluence from said reaction zone is passed to a fractionating zone, the steps which comprise contacting said reactor effluence comprising hydrocarbons and entrained metal halide in the vapor state with a counter-current stream of a controlled amount of cool hydrocarbons having the same number of carbon atoms to the molecule as said isomerized hydrocarbons in a catalyst separating zone to effect the condensation of substantially all of said entrained metal halide in the absence of any substantial condensation of hydrocarbons, separately removing vapors comprising hydrocarbons free of any substantial trace of metal halide and liquid comprising hydrocarbons containing substantially all of said entrained metal halide from said catalyst separating zone, passing said vapors to said fractionating zone, and introducing at least a part of said liquid into said reaction zone at a plurality of points along the length thereof.

SUMNER H. McALLISTER.
JOHN ANDERSON.
WILLIAM E. ROSS.